(12) United States Patent
Seelhammer et al.

(10) Patent No.: US 7,876,399 B2
(45) Date of Patent: Jan. 25, 2011

(54) LIQUID CRYSTAL DISPLAY WITH SPLIT ELECTRODE

(75) Inventors: Mark A. Seelhammer, Chandler, AZ (US); David G. Pires, Phoenix, AZ (US); Robert Allen Kimball, Gilbert, AZ (US)

(73) Assignee: Rogers Corporation, Rogers, CT (US)

( * ) Notice: Subject to any disclaimer, the term of this patent is extended or adjusted under 35 U.S.C. 154(b) by 155 days.

(21) Appl. No.: 12/229,050

(22) Filed: Aug. 19, 2008

(65) Prior Publication Data

US 2010/0045180 A1   Feb. 25, 2010

(51) Int. Cl.
 G02F 1/1335 (2006.01)
(52) U.S. Cl. .......................................... 349/69; 349/86
(58) Field of Classification Search .................. 349/69, 349/86
 See application file for complete search history.

(56) References Cited

U.S. PATENT DOCUMENTS

| | | | | |
|---|---|---|---|---|
| 2,928,974 | A | | 3/1960 | Mash .......................... 313/494 |
| 4,992,201 | A | * | 2/1991 | Pearlman .................. 252/299.1 |
| 5,121,234 | A | | 6/1992 | Kucera .......................... 359/50 |
| 5,508,585 | A | | 4/1996 | Butt .............................. 313/509 |
| 5,821,691 | A | | 10/1998 | Richie et al. ................. 313/506 |
| 6,441,551 | B1 | * | 8/2002 | Abe et al. ..................... 313/503 |
| 6,639,578 | B1 | * | 10/2003 | Comiskey et al. ............ 345/107 |
| 6,842,170 | B1 | * | 1/2005 | Akins et al. .................. 345/173 |
| 6,934,313 | B1 | * | 8/2005 | Deacon ......................... 372/64 |
| 7,671,943 | B2 | * | 3/2010 | Chu et al. ..................... 349/114 |
| 7,687,808 | B2 | * | 3/2010 | Umezaki ....................... 257/72 |
| RE41,324 | E | * | 5/2010 | Fujii et al. ................... 349/149 |
| 2002/0163606 | A1 | * | 11/2002 | Kitai et al. .................... 349/98 |
| 2005/0168665 | A1 | * | 8/2005 | Ina et al. ....................... 349/42 |
| 2006/0250534 | A1 | | 11/2006 | Kutscher et al. .............. 349/41 |
| 2007/0085955 | A1 | * | 4/2007 | Kimura ....................... 349/129 |
| 2007/0236640 | A1 | * | 10/2007 | Kimura ....................... 349/141 |
| 2008/0165302 | A1 | * | 7/2008 | Yasui et al. ................... 349/48 |
| 2008/0186436 | A1 | * | 8/2008 | Chu et al. ..................... 349/114 |
| 2008/0284719 | A1 | * | 11/2008 | Yoshida ....................... 345/102 |
| 2008/0284768 | A1 | * | 11/2008 | Yoshida et al. .............. 345/208 |
| 2008/0284929 | A1 | * | 11/2008 | Kimura ......................... 349/38 |
| 2009/0009676 | A1 | * | 1/2009 | Kimura et al. ................. 349/43 |
| 2010/0002157 | A1 | * | 1/2010 | Lee et al. ...................... 349/33 |

FOREIGN PATENT DOCUMENTS

WO   WO2005/121878   12/2005

* cited by examiner

*Primary Examiner*—K. Cyrus Kianni
(74) *Attorney, Agent, or Firm*—Paul F. Wille

(57) ABSTRACT

A light shutter includes a first electrode, a second electrode, and a third electrode, wherein the first and second electrodes are capacitively coupled to each other by the third electrode. The first electrode and the second electrode can be segmented and the segments separately addressed. In a display having a light shutter and an EL panel stacked on the same side of a substrate, there is a common front electrode and separate rear electrodes for operating the light shutter and the EL panel. The common electrode is electrically floating and the rear electrodes are capacitively coupled to each other by the common front electrode. The rear electrodes can be segmented and the segments separately addressed.

14 Claims, 2 Drawing Sheets

LIQUID CRYSTAL DISPLAY WITH SPLIT ELECTRODE

BACKGROUND TO THE INVENTION

This invention relates to liquid crystal displays and, in particular, to a display having an electrode that is split and capacitively coupled to a common electrode.

GLOSSARY

As used herein, a "display" is a device that provides information in visual form to a viewer.

A "graphic" can be text, a symbol, an arbitrary shape, or some combination thereof. A graphic can be translucent, diffuse, shaded, colored, a silhouette or outline, or some combination thereof. Graphics can be positive (black on white) or negative (white on black), where white is diffuse, shaded, etc.

A "phosphor" is not restricted to a single type of phosphor or dopant and does not exclude cascading phosphors or dyes for color enhancement.

An "EL layer" is a layer containing phosphor and dielectric or separate layers of phosphor and dielectric.

An "EL lamp" is a thick film, capacitive device including an EL layer between two electrodes, at least one of which is transparent. The phosphor is luminous when a voltage is applied to the electrodes. A "panel" is a plurality of EL lamps on a commons substrate. The lamps may be operated independently of one another or in unison. Alternating current must be used to drive an EL lamp.

A "thick film" EL lamp refers to one type of EL lamp and "thin film" EL lamp refers to a different type of EL lamp. The terms only broadly relate to actual thickness and actually identify distinct disciplines. A thin, thick film EL lamp is not a contradiction in terms and such a lamp is much thicker than a thin film EL lamp.

"Opaque" does not mean that no light is transmitted, only that the amount of light transmitted is substantially reduced, e.g. to fifteen percent of incident light.

"Overlying" or "underlying" do not imply orientation and merely describe a situation wherein layers of materials have major surfaces facing each other, with or without contact. The surfaces are not necessarily planar.

A liquid crystal display is a capacitive structure, having a dielectric (liquid crystal) between two electrodes, at least one of which is transparent. Often both electrodes are transparent and typically are made from indium tin oxide (ITO) sputtered on a transparent substrate, such as a dimensionally stable, transparent sheet of plastic. In order to provide graphic or alpha-numeric information, at least one of the electrodes is patterned. Typically, this includes screen printing a mask and etching the ITO layer. Etching is a chemical process with attendant problems, and cost, of handling and waste treatment.

In the last twenty years, a particular class of materials, known as polymer dispersed liquid crystals (PDLC), has been developed for displays; e.g., see U.S. Pat. No. 4,992,201 (Pearlman). Devices using these materials operate on alternating current at 60-120 volts peak-to-peak, unlike earlier liquid crystal materials that operated at much lower voltages, and provide contrast without the need for polarizers. Sometimes referred to as "optical shutters," polymer dispersed liquid crystals have applications outside the realm of displays.

U.S. Pat. No. 6,842,170 (Akins et al.) discloses a liquid crystal display combined with an electroluminescent (EL) back light and a touch screen. The liquid crystal display is part of a keypad, containing a mask layer with images of the buttons on a telephone (0-9, * and #) and other control buttons. It is also disclosed that the liquid crystal display and the EL back light can share a common substrate.

International Publication WO 2005/121878 discloses a liquid crystal display and an EL back light on the same side of a substrate, as does U.S. Application Publication 2002/0163606 (Kitai et al.). Other permutations are known in the art, with devices on opposite sides of a substrate; e.g., see U.S. Pat. No. 5,121,234 (Kucera) and U.S. Pat. No. 6,441,551 (Abe et al.). Various interlayers or outer layers for affecting optical performance, e.g. color, reflectance, and dispersion, are also known in the art. These devices are typically built front to rear, which means that the first layer on the substrate is a transparent front electrode. Subsequent layers cover the front electrode, making electrical contact with the front electrode difficult. Also, bus bars must be used to reduce resistance from the electrode to a point of contact, which can introduce additional problems with location and uneven thickness, particularly for multi-segment displays.

An EL device emits light at almost any applied voltage. Useful amounts of light generally require more than sixty volts rms. Liquid crystal devices are more like switches: they do not change state until a threshold voltage is reached, e.g. eighty volts rms. For PDLC, the voltage is 10-40 volts rms. The response curve is not perfectly square—that would be impossible because of the voltage gradient across the thickness of the material—but the change is relatively abrupt, certainly compared with the roughly linear response of an EL lamp to voltage; e.g. see U.S. Application Publication 2006/0250534 (Kutscher et al.).

Driving EL and PDLC between a single pair of electrodes, as disclosed in the '234 patent and the '551 patent, is not entirely straightforward. For some applications, the answer is simple. Apply a large enough voltage to open shutters and cause the EL lamps to emit light. For multi-segment displays, there was no simple answer to driving EL and PDLC simultaneously, e.g. because of problems routing conductive traces.

The choice of a technology for a particular display is a balance of competing interests, not the least of which is cost. In the case of cellular telephones, the choice is often based on the presumption that the user will be indoors or at least not in direct sunlight when the telephone is used. In other words, the content of the display all but vanishes in bright light because the display relies on luminous back lighting for visibility. Many liquid crystal displays rely on reflective back lighting. Thus, the back lighting increases or decreases with ambient light and the content of the display remains visible. Some displays try for the best of both worlds with a "transflective" layer between a back light and a liquid crystal module.

Screen printing and roll coating are both well known processes for manufacturing EL lamps and other devices. A problem with screen printing is the cost and handling of product in a piecemeal fashion. A problem with roll coating liquid crystal material is the need to provide access to the first deposited electrode for electrical contact. Etching is costly, both in the number of steps and in the possibly environmentally unfriendly materials used for etching. Other solutions, e.g. such as disclosed in U.S. Pat. No. 5,821,691 (Richie et al.) are useful but restrict the location of the first electrode. It is known in the art of electroluminescent lamps to capacitively couple to the first deposited electrode by using a split electrode on the opposite side of a panel; e.g. see U.S. Pat. No. 2,928,974 (Mash). It is also known that there is a problem with this approach because brightness is proportional to area; e.g. see U.S. Pat. No. 5,508,585 (Butt). This means that two or more electrodes must be equal in area in order for the lamps to be equal in luminance, all other factors being the same.

U.S. Pat. No. 6,934,313 (Deacon) discloses an optical waveguide of PDLC material having two electrodes on one side of the PDLC material and a third electrode on the other side of the PDLC material. The two electrodes are not capacitively coupled to each other by the third electrode because the third electrode does not float electrically. Transparent electrodes are also disclosed.

In view of the foregoing, it is therefore an object of the invention to provide a PDLC light shutter in which one electrode is split.

Another object of the invention is to provide a split electrode capacitively coupled to a floating electrode for controlling a PDLC layer.

A further object of the invention is to enable roll coating of the front electrode of a light shutter.

Another object of the invention is to provide a common, floating, front electrode for stacked PDLC and EL layers.

A further object of the invention is to provide capacitively coupled electrodes for PDLC and EL layers.

Another object of the invention is to provide optimum drive voltages for each layer in a stack including a PDLC layer and an EL layer.

A further object of the invention is to simplify the construction of displays having light shutters as part of the display.

Another object of the invention is to provide a light shutter and EL panel on the same side of a substrate with a common front electrode and separate rear electrodes.

SUMMARY OF THE INVENTION

The foregoing objects are achieved by this invention in which a light shutter includes a first electrode, a second electrode, and a third electrode, wherein the first and second electrodes are capacitively coupled to each other by the third electrode. The first electrode and the second electrode can be segmented and segments separately addressed. In a display having a light shutter and an EL panel stacked on the same side of a substrate, there is a common front electrode and separate rear electrodes for operating the light shutter and the EL panel. The common electrode is electrically floating and the rear electrodes are capacitively coupled to each other by the common front electrode. The rear electrodes can be segmented and the segments separately addressed.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
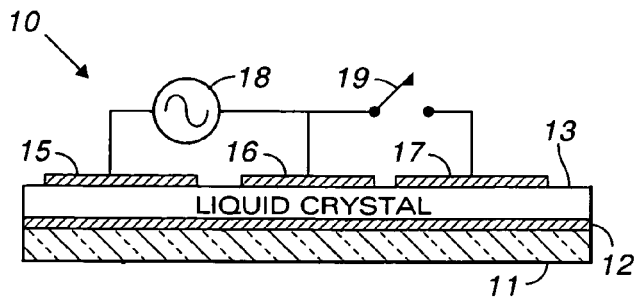
FIG. 1 is a cross-section of a light shutter constructed in accordance with a preferred embodiment of the invention.

FIG. 1 illustrates a light shutter constructed in accordance with a preferred embodiment of the invention. Specifically, light shutter 10 includes transparent substrate 11 and transparent electrode 12 overlying one major surface of the substrate. Liquid crystal layer 13 overlies electrode 12. Overlying liquid crystal layer 13 are electrodes 15, 16, and 17. Electrodes 15 and 16 are coupled to source 18 of alternating current and are driven to opposite polarities. Electrode 17 is coupled by switch 19 to the same terminal on source 18 as electrode 16.

Substrate 11 can be glass or any transparent polymeric material, such as polycarbonate or polyethylene terephthalate (PET). It is only required that the substrate be transparent and can be coated with an adherent layer of transparent, conductive material. The thickness of substrate 11 is not critical and depends upon application. Transparent electrode 12 is preferably indium tin oxide. Liquid crystal layer 13 is preferably a polymer dispersed liquid crystal.

In accordance with one aspect of the invention, layer 13 is roll coated and is not patterned to provide clearance for contact to electrode 12. In accordance with another aspect of the invention, electrode 12 is floating; i.e. there is no ohmic connection to layer 12. In accordance with a third aspect of the invention, the electrodes on the upper surface of layer 13 are capacitively coupled to each other by means of electrode 12.

Figure 2:
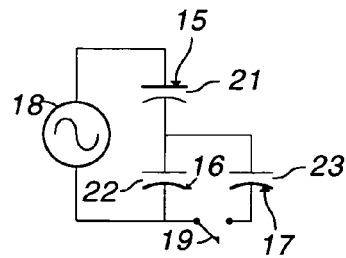
FIG. 2 is a schematic of the embodiment of FIG. 1.

FIG. 2 is a schematic of the circuit illustrated in FIG. 1, with corresponding elements bearing the same reference number as in FIG. 1. Capacitor 21, which includes electrode 15, is coupled in series with capacitor 22, which includes electrode 16. Capacitor 23, which includes electrode 17, is coupled in parallel with capacitor 22.

With switch 19 open, capacitors 21 and 22 form a voltage divider that produces a voltage at their junction, i.e. on electrode 12, in inverse proportion to the ratio of their capacitances. Only when the capacitances are substantially equal is the voltage from source 18 halved by the voltage divider.

As known in the art, capacitance is proportional to area and inversely proportional to the distance between the plates or electrodes. As a first approximation, it is presumed that the areas of the plates in a given capacitor are equal even though it is obvious from FIG. 1 that electrode 12 is vastly bigger than the other electrodes.

It has been discovered that the coupling effect can not only be exploited for selectively switching liquid crystal material, it can also be used to control both liquid crystal and electroluminescent layers from a common electrode, thereby eliminating the need to make ohmic contact with the front, transparent, electrode in a display. This greatly reduces costs, reduces thickness, and simplifies the construction of a shuttered light source for a display. The layers can be on the same side of a substrate, whereby the substrate can be the exposed, outer surface of a display. The need for protective layers, special handling, and other problems is thus avoided.

Figure 3:
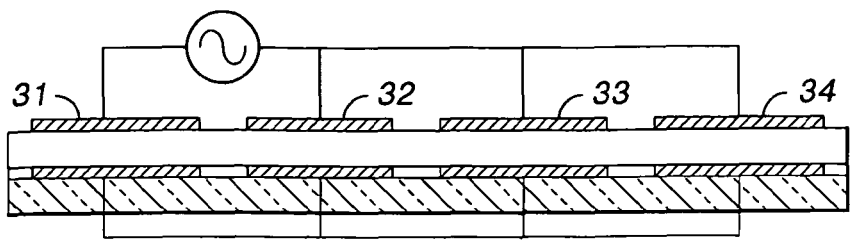
FIG. 3, FIG. 4, FIG. 5, FIG. 6, and FIG. 7 illustrate the operation of a device constructed in accordance with the invention.

FIG. 3 is essentially the same, electrically, as FIG. 1 except that the common electrode has been divided into several smaller, electrically connected electrodes and switch 19 has been eliminated. The common electrode is floating. For the sake of discussion, all electrodes are presumed to have the same area.

Figure 4:
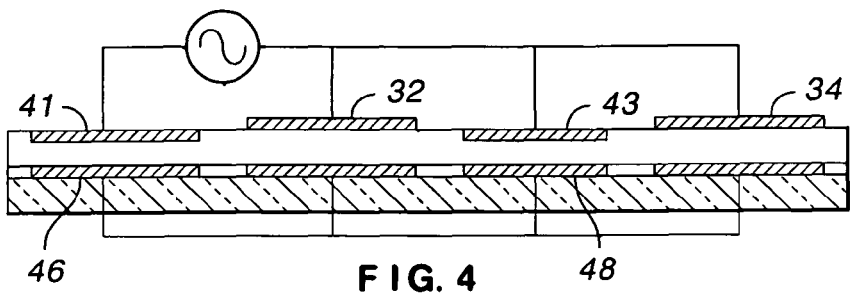

In FIG. 4, the structure has been modified slightly. Electrodes 41 and 43 are positioned lower than electrodes 31 and 33 (FIG. 3). This decreases the distance to electrodes 46 and 48 and increases the capacitance of these capacitors.

Figure 5:
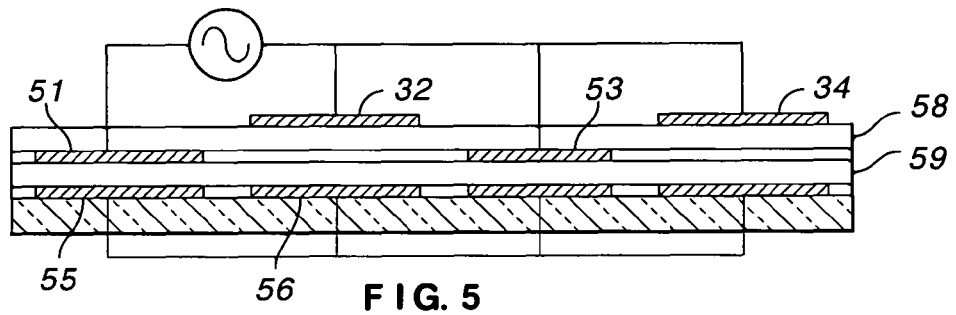

In FIG. 5, electrode 51 is displaced from electrode 32. Although it may appear that the electric field should extend from electrode 51 to electrode 32, this is not the case, at least not in any meaningful way. Capacitance is determined by area of overlap. The capacitance associated with electrodes 51 and 55 is far greater than the capacitance associated with electrodes 32 and 55. Thus, the alternating current flows from electrode 51 to electrode 55 and from electrode 56 to electrode 32 (ignoring the other electrodes for the moment).

The displacement of the electrodes is such that two chambers are created, chambers 58 and 59. If these contain air, for example, the dielectric constants of the chambers are equal and the capacitance of electrodes 51 and 55 is much greater than the capacitance of electrodes 32 and 56.

Figure 6:
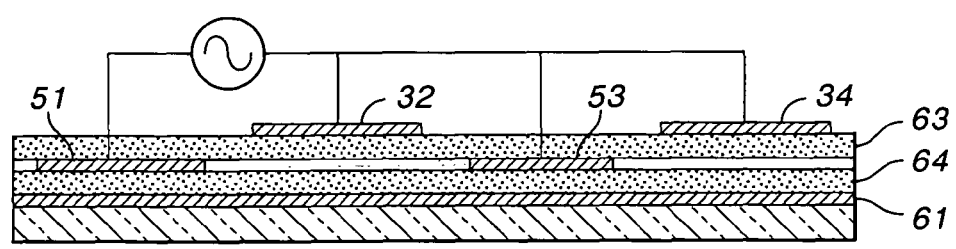

In FIG. 6, the segmented lower electrode has been replaced with electrically identical, continuous electrode 61. This is to simplify the drawing. Layer 63 is interposed between electrodes 32 and 34 and electrodes 51 and 53. Similarly, layer 64 is interposed between electrodes 51 and 53 and common electrode 61.

The capacitor formed by electrodes 32 and 61 and the capacitor formed by electrodes 34 and 61 have two dielectrics, whereas the capacitor formed by electrodes 51 and 61 and the capacitor formed by electrodes 53 and 61 have only one dielectrics. If the materials of layers 63 and 64 are the same, this is of no consequence. If, in accordance with another aspect of the invention, the materials are not the same, a whole new world of possibilities opens up.

In particular, layer 63 is preferably an EL layer and layer 64 is preferably PDLC. The dielectric constant of an EL layer is generally lower than the dielectric constant of PDLC. The path from electrode 51 to electrode 32 includes two capacitors and three dielectrics. Voltage drop can be calculated as though there were three capacitors in series.

As known in the art, the capacitance of capacitors connected in series is equal to the reciprocal of the sum of the reciprocals of the capacitances, as in the following equation.

$$C = \frac{1}{\frac{1}{C_1} + \frac{1}{C_2} + \frac{1}{C_3}}$$

The voltage divides as the inverse of the capacitances. Thus, for equal areas, equal dielectric constants, and equal thicknesses, the voltage drop across each dielectric is the same. Thus, the voltage across electrode 51 and 61 is one third the applied voltage and the voltage across electrodes 61 and 32 is two thirds the applied voltage. As the dielectric constants, distances, and areas change, the situation becomes more complicated but the same rules apply. In accordance with the invention, these rules are exploited to provide novel displays.

Figure 7:
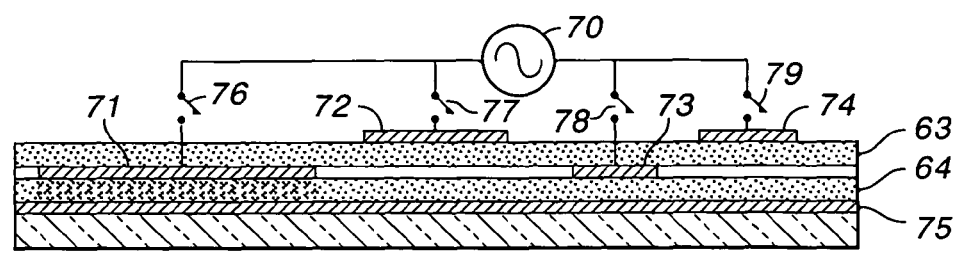

For example, in FIG. 7, electrode 71 is substantially larger than electrodes 72, 73, or 74. This means that the capacitance between electrode 71 and 75 is larger than the capacitance between electrode 73 and electrode 75. With switches 76 and 78 closed, the voltage across electrodes 71 and 75 is therefore lower than the voltage across electrodes 73 and 75. As noted above, liquid crystal material behaves like a switch. Thus, the volume of PDLC between electrodes 71 and 75 remains opaque, indicated by the darker stippling, while the volume of PDLC between electrodes 73 and 75 is transparent. This selectivity, which applies to the electroluminescent layer also, enables one to design displays of considerable sophistication.

Figure 8:
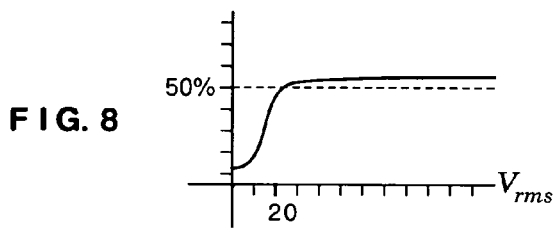
FIG. 8 is a chart illustrating the operation of a layer of PDLC material.

FIG. 8 illustrates the operation of a layer of representative PDLC material. As indicated by the curved line, the material remains opaque until the voltage across the layer exceeds some threshold, e.g., twenty volts rms. Then, the layer becomes substantially transparent. Increasing the voltage above the threshold does not change transparency significantly, as indicated by comparison with the dashed line. Normally transparent material works oppositely.

In FIG. 7, some electrodes are coupled to one side of AC source 70 and some to the other. Any number of electrodes can be coupled to either side of the AC source. The electrodes are coupled to source 70 by switches. A switch is indicated as being in series with each electrode. This may not be the case in practice, depending upon the nature of the display. The electrodes are selected in combinations that need not include all electrodes. Stated another way, the entire set of electrodes can be selected in any number of sub-sets to produce a desired display.

Although a given design may seemed fixed by the physical construction of a display, this is not the case. Once constructed, one cannot change spacing or dielectric constant but one can, in effect, change area by selectively combining areas, e.g. by closing or opening switches 76, 77, 78, and 79, thereby increasing capacitance and reducing voltage or decreasing capacitance and increasing voltage, affecting the EL layer, the PDLC layer, or both layers.

For example, assume that layer 63 is an EL layer and layer 64 is a layer of PDLC material. Closing switches 76 and 78 can render the layer 64 transparent in the area of electrode 73 (ignoring the relative areas of the electrodes for the moment), allowing incident light to be reflected from the EL layer. Thus, a device constructed as illustrated in FIG. 7 can operate in a "daytime" mode, with no backlighting, and in a "night time" mode, with backlighting.

In the following examples, change is effected by changing areas to adjust voltage. These and many other combinations are possible in a multi-segment display without access to the front electrode. Construction is simplified yet highly variable displays can be produced in accordance with the invention.

Assume that switches 77 and 79 are closed. EL layer 63 emits light in the regions beneath electrodes 72 and 74 and PDLC layer 64 is transparent in the regions beneath electrodes 72 and 74. Closing switch 76 adds greatly to the capacitance on the left side of source 70 (assuming it has a relatively large area as illustrated), reducing the voltage. The regions under electrodes 71 and 72 are opaque. The region in EL layer 63 under electrode 72 dims and the region in EL layer 63 under electrode 74 brightens.

Assume that switches 77 and 79 are closed. EL layer 63 emits light in the regions beneath electrodes 72 and 74 and PDLC layer 64 is transparent in the region below of electrode 72. Closing switch 78 adds capacitance to the right hand side of source 70, thereby reducing the voltage across electrode 74 and electrode 75, dimming EL layer 63 in the area of electrode 74 and brightening EL layer in the area of electrode 72.

Depending upon the relative areas, PDLC layer 64 can be made opaque because of the reduced voltage, even when the region above in EL layer 63 is luminous. A region of EL layer 63 can remain luminous when the underlying shurtter layer is opaque because of the relatively linear response of the EL layer to voltage and the very non-linear response of the PDLC layer to voltage. Thus, one can use electrode 74, or any electrode, to vary the net capacitances of other lamps and shutters in a set or sub-set of electrodes.

Without trying to exhaust all possible combinations, operation can be likened to the common electrode acting somewhat like the fulcrum of a see-saw. Decreasing brightness or opacity on one side increases brightness or opacity on the other side. This feature allows one to affect a display remotely from the affected area and greatly increases the flexibility of the design of a display.

Figure 9:
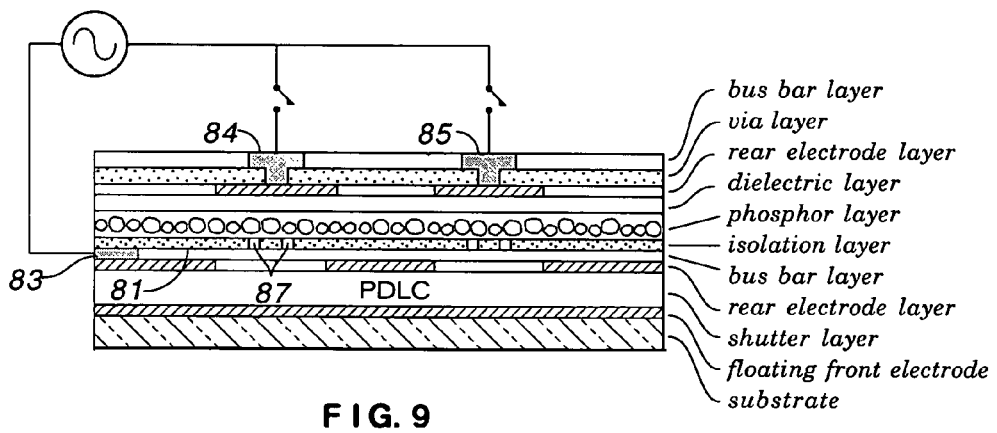
FIG. 9 is a cross-section of a back lit shutter constructed in accordance with a preferred embodiment of the invention.

FIG. 9 is a cross-section of a preferred embodiment of the invention. In this embodiment, the basic structure is as shown in FIG. 7, with the addition of isolation layer 81 and bus bars 83, 84, and 85. Isolation layer 81 modifies the dielectric constant between the electrodes for the EL lamps and can include a graphic, such as graphic 87. Isolation layer 81 is optional and provides a convenient way to modify dielectric constant without reformulating inks for the phosphor layer or the dielectric layer. Layer 81 also provides a convenient way to add a graphic.

Figure 10:
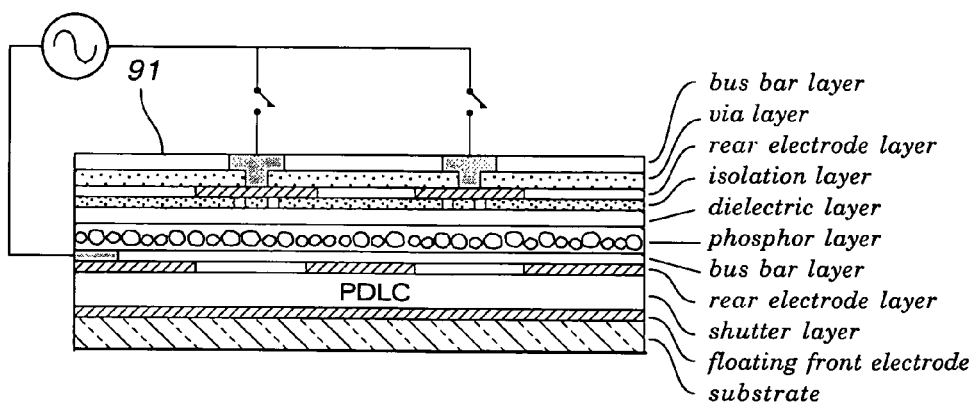
FIG. 10 is a cross-section of a back lit shutter constructed in accordance with an alternative embodiment of the invention.

FIG. 10 is a cross-section of an alternative embodiment of the invention. FIG. 9 differs from FIG. 8 in the location of isolation layer 91. In FIG. 8, isolation layer 81 is between the phosphor layer and the front electrode. In FIG. 9, isolation layer 91 is between the dielectric layer and the rear electrode.

The invention thus provides a PDLC light shutter in which one electrode is split and the split electrode is capacitively coupled to a floating electrode. Because an electrode is floating, a PDLC layer can be roll coated over the floating electrode, reducing costs, providing greater uniformity, and simplifying construction. Two layers of split electrodes can separately control a layer of PDLC and a layer of EL material. By controlling capacitance, one can optimize drive voltages for the PDLC layer and the EL layers.

Having thus described the invention, it will be apparent to those of skill in the art that various modifications can be made within the scope of the invention. For example, the several illustrations are not exhaustive of the series-parallel combinations of capacitors that can be made in an actual embodiment of the invention. Although described in terms of the electrodes defining the pattern, the phosphor layer can be patterned (e.g. screen printed) instead of or in addition to having patterned electrodes. Gaps in the pattern can be used as "dummy" loads for adjusting capacitance and voltage.

What is claimed as the invention is:

1. A display comprising:
    a light shutter including a layer of polymer disposed liquid crystal material, a first electrode, a second electrode, and a third electrode,
    wherein the first and second electrodes are capacitively coupled to each other by the third electrode,
    wherein said first electrode and said second electrode are on a first side of said layer and the third electrode is on a second side of the layer, opposite the first electrode and the second electrode, and
    wherein the first electrode and the second electrode are coupled to a source of voltage and said third electrode is electrically floating.

2. The display as set forth in claim 1 and further including a fourth electrode on said first side of said layer, said fourth electrode being selectively coupled to one of the first electrode and the second electrode.

3. The display as set forth in claim 1 and further including a transparent substrate and an EL layer,
    wherein said light shutter overlies the transparent substrate, said EL layer overlies the light shutter, said first electrode is between the light shutter and the EL layer, and said second electrode overlies the EL layer.

4. The display as set forth in claim 3 wherein the second electrode has plural segments.

5. The display as set forth in claim 4 wherein the segments are separately addressable.

6. The display as set forth in claim 3 wherein the first electrode has plural segments.

7. The display as set forth in claim 6 wherein the segments are separately addressable.

8. The display as set forth in claim 3 wherein the first and second electrodes each have plural segments.

9. The display as set forth in claim 8 wherein the plural segments are separately addressable.

10. The display as set forth in claim 9 wherein selecting a particular combination of segments causes a first region of the EL layer to emit light and a corresponding region of the light shutter to be opaque, thereby blocking the light from the first region.

11. The display as set forth in claim 10 wherein selecting said particular combination of segments causes a second region of the EL layer to increase in brightness and a second light shutter to be transparent.

12. The display as set forth in claim 3 wherein the EL layer is patterned.

13. The display as set forth in claim 3 wherein the first electrode controls the opacity of the light shutter, and the second electrode controls emissions from the EL layer.

14. The display as set forth in claim 13 wherein said third electrode overlies said transparent substrate and the light shutter overlies said third electrode.

* * * * *